United States Patent [19]

Shelton

[11] 4,034,465
[45] July 12, 1977

[54] MACHINING CENTER AND METHOD OF OPERATION

[75] Inventor: Conway D. Shelton, Indianapolis, Ind.

[73] Assignee: The Cross Company, Fraser, Mich.

[21] Appl. No.: 585,026

[22] Filed: June 9, 1975

[51] Int. Cl.$^2$ .................................... B23Q 3/157
[52] U.S. Cl. ........................... 29/568; 29/26 A; 29/426; 29/563; 408/35
[58] Field of Search ......... 29/568, 26 A, 426, 33 P, 29/563; 408/35

[56] References Cited

U.S. PATENT DOCUMENTS

| 2,745,167 | 5/1956 | Cross | 29/33 P |
|---|---|---|---|
| 3,052,999 | 9/1962 | Sedgwick et al. | 29/568 X |
| 3,286,595 | 11/1966 | Wollenhaupt | 29/568 X |
| 3,576,540 | 4/1971 | Fair et al. | 29/563 X |
| 3,635,569 | 1/1972 | Sato et al. | 29/568 X |
| 3,760,472 | 9/1973 | Kielma et al. | 29/568 X |
| 3,762,036 | 10/1973 | Goebel et al. | 29/568 |
| 3,851,380 | 12/1974 | Kurimoto et al. | 29/568 |

Primary Examiner—Othell M. Simpson
Assistant Examiner—Z. R. Bilinsky
Attorney, Agent, or Firm—Harness, Dickey & Pierce

[57] ABSTRACT

A machining center having an endless track with movable tool heads, and one or more machining stations at which the tool heads may be successively stopped. Each station has means for driving the tool head and a workpiece saddle which may be advanced during the machining operation. The arrangement has high flexibility for automatically machining different types of workpieces and may be adapted to varying production requirements without unnecessary equipment.

27 Claims, 21 Drawing Figures

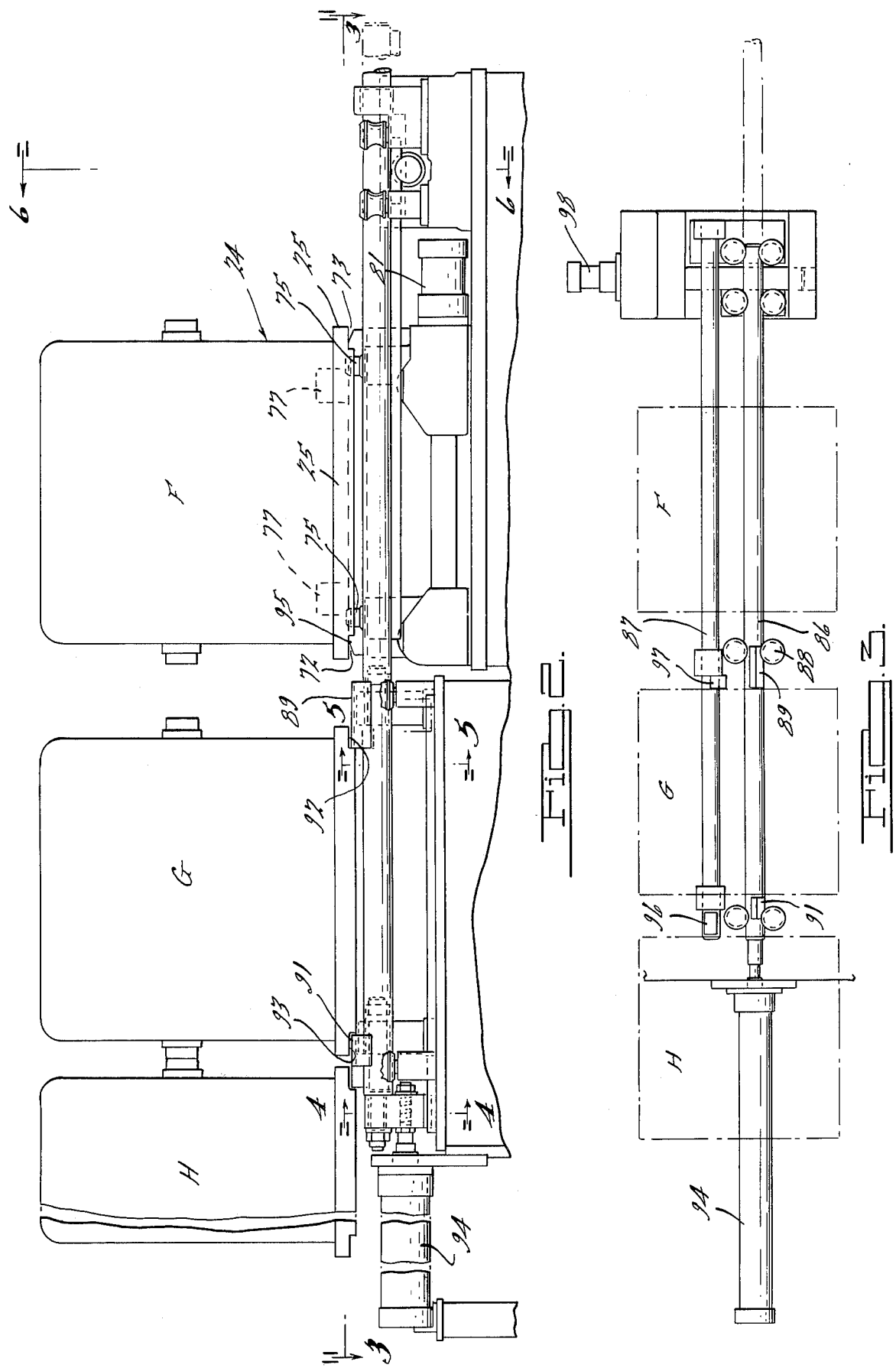

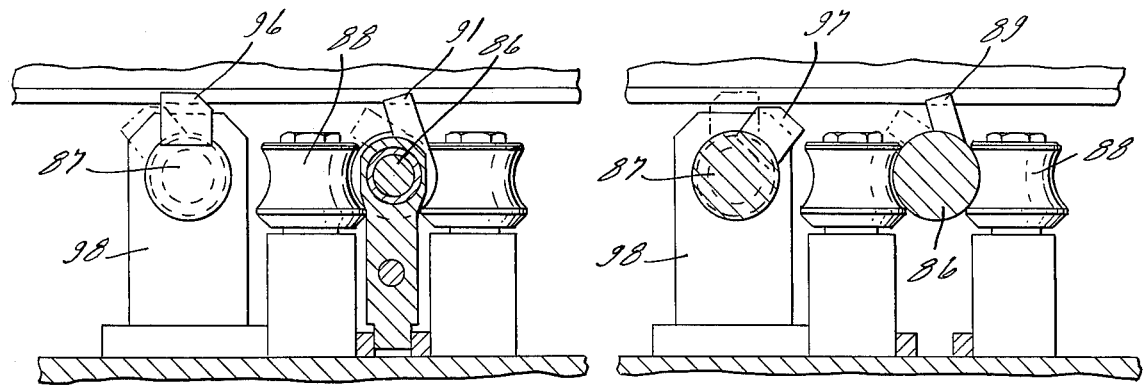
Fig. 4. Fig. 5.
Fig. 6.
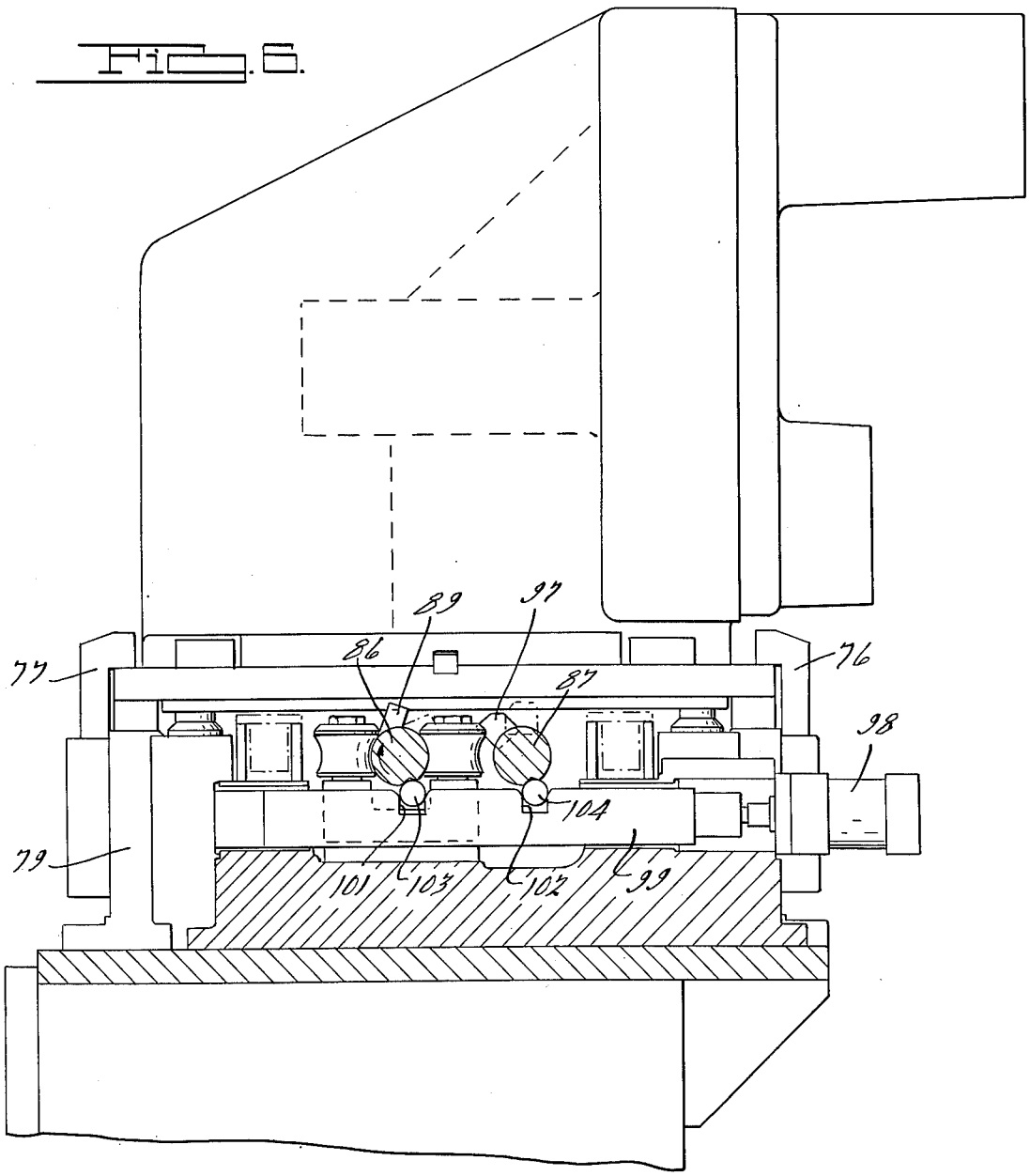

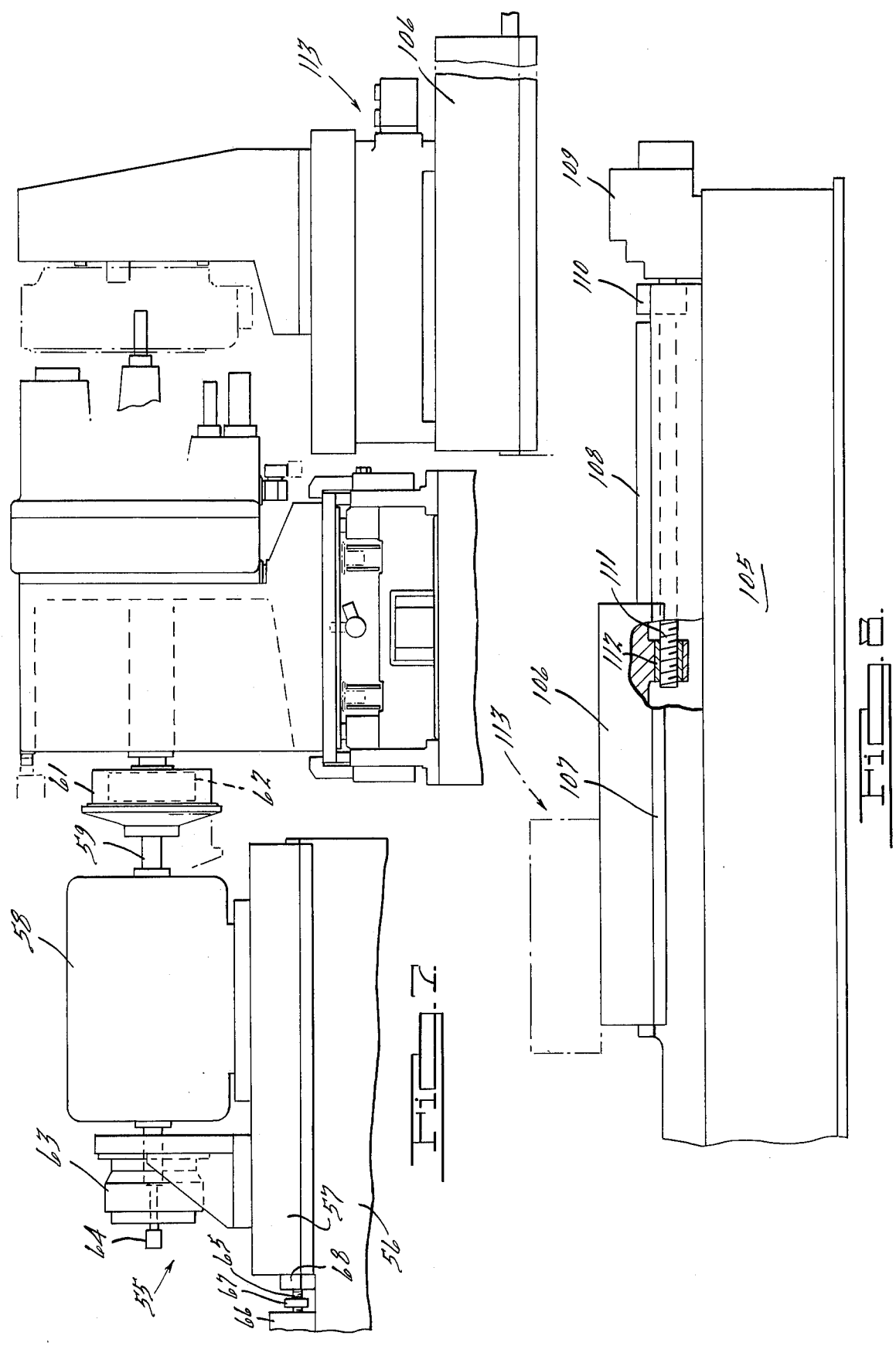

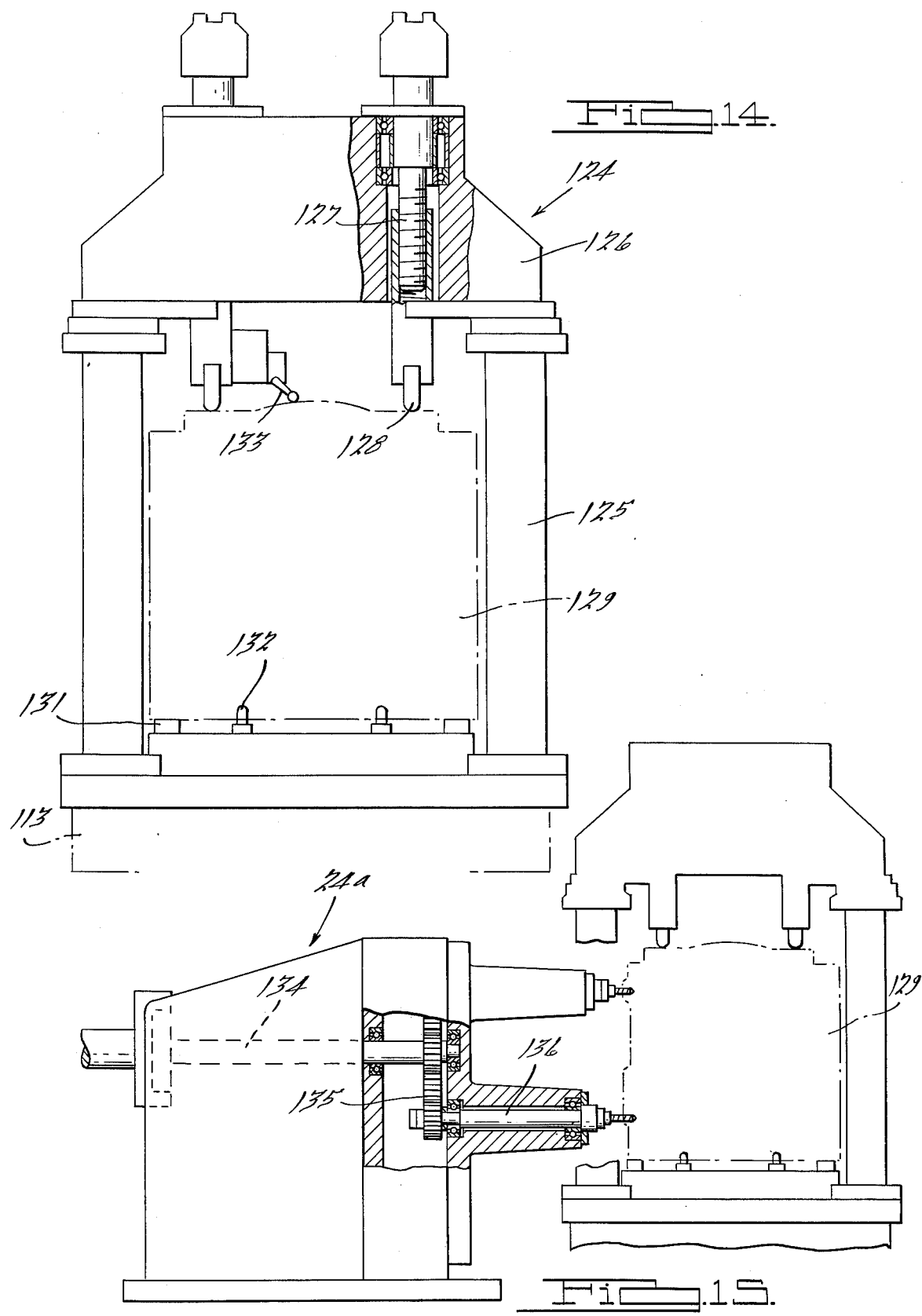

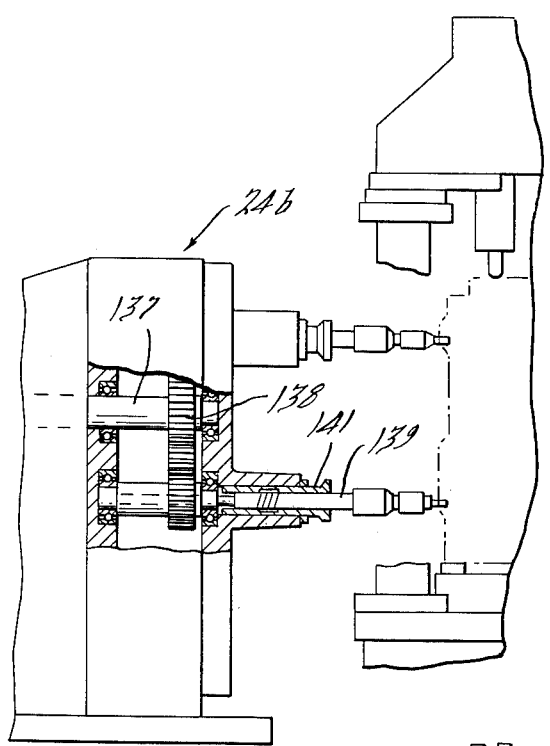
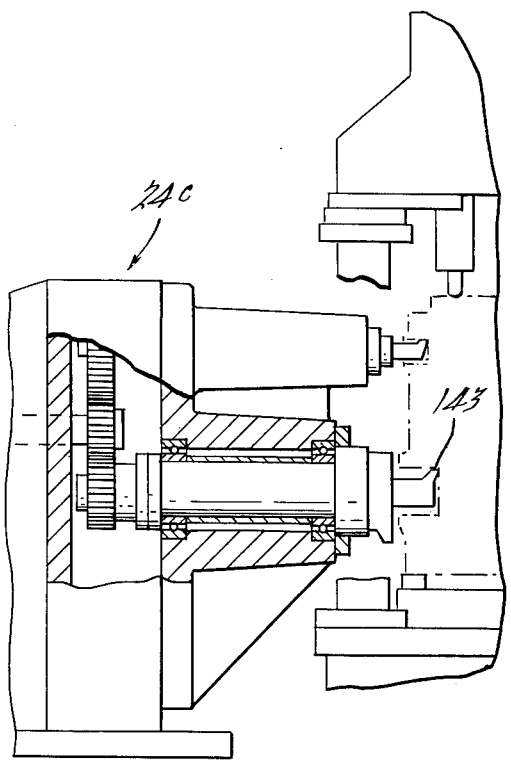
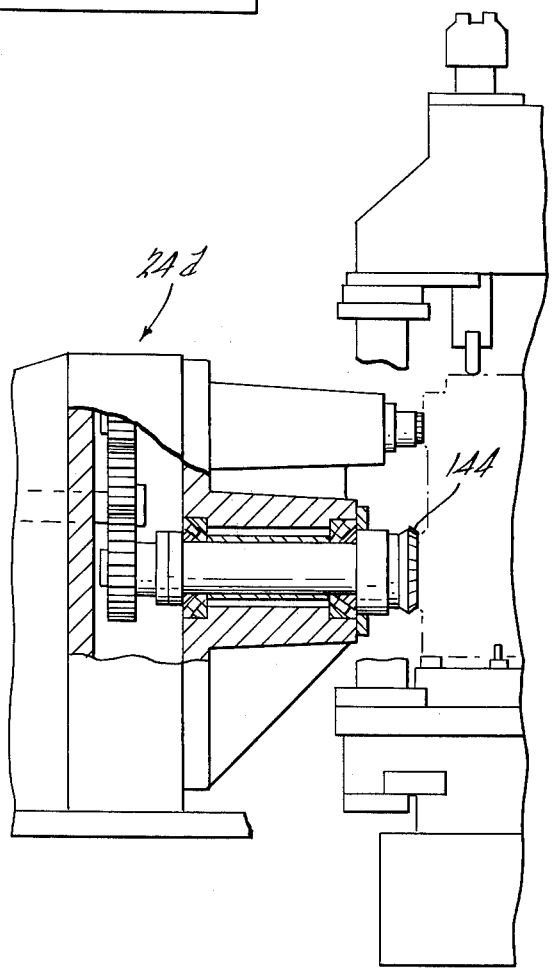

MACHINING CENTER AND METHOD OF OPERATION

BACKGROUND OF THE INVENTION

1. Field of the Invention

The invention relates to the volume machining of workpieces, and more particularly to drilling, tapping, boring, milling and other operations to be performed on a sizable number of workpieces which may all be alike or may vary from each other. The invention is also particularly concerned with machining operations requiring multiple spindle tool heads, especially those in which a large number of spindles are needed.

2. Description of the Prior Art

Machine tools have been developed for mass production, including dial, shuttle, automatic multi-spindle bar and transfer machines. Low production machine tools in which high accuracy is required include single-spindle numerical machining centers, in some cases equipped with automatic tool changers to achieve higher productivity. In many cases, single-spindle machining centers will not produce the required output without using a plurality of machines, each of which has a base, motor, spindle and other components. The purchase of multiple machines thus increases the required investment to a level where other methods, such as transfer machines, become more economical. Such machines, however, may have a production capacity far in excess of that required.

A search of the subject matter of this invention revealed U.S. Pat. Nos. 3,762,036, 3,650,018, 3,810,299 and 3,789,473. The first-mentioned patent, although perhaps the most pertinent, has several drawbacks as compared with the present invention, such as inability to handle large multiple spindle heads, and inherent problems with respect to tool location accuracy.

BRIEF SUMMARY OF THE INVENTION

It is an object of the present invention to provide a machining center which will economically handle production volumes higher than the single-spindle machining centers but less than those of which mass production machine tools, such as transfer machines, are capable.

It is another object to provide a method of machining workpieces which permits low-cost production of parts using a number of different tool heads in a rapid and efficient manner.

It is an associated object to provide an improved machining center which is versatile and flexible, so that the equipment added to the basic center to gradually increase production may be obtained with investment costs proportional to the production increases required.

It is also an object to provide an improved machining center of this type capable of handling families of workpieces, for example parts of different sizes, with a minimum of down time to change over the machine.

It is another object to provide an improved machining center of this character which can in some cases handle random assortments of several different kinds of workpieces without the necessity of changing the tool heads.

It is a further object to provide an improved machining center of this type which is capable of utilizing multiple spindle tool heads of relatively great size and capacity, such as those used in transfer lines.

It is also an object to provide a machining center of this type which conserves power consumption by driving a multiplicity of tool heads in succession, using only a single motor.

Briefly, the machining center of this invention comprises an endless track defining a path, a plurality of tool heads supported for movement along said track, a machining station on said track, means at said machining station for accurately locating and securing certain tool heads while still on the path of said track for machining operation, tool head drive means at the machining station, means for selectively engaging said drive means with a secured tool head, work supporting means at said station, and means for moving said work supporting means from a retracted position to a position in which the workpiece is engaged by the tools carried by the tool head and back to a retracted position.

BRIEF DESCRIPTION OF THE DRAWINGS

FIG. 2 is a side elevational view in the vicinity of a machining station and showing the escapement and shuttle bars and their attendant mechanisms;

FIG. 3 is a fragmentary cross-sectional plan view taken along the line 3—3 of FIG. 2;

FIG. 4 is a fragmentary cross-sectional view in elevation taken along the line 4—4 of FIG. 2;

FIG. 5 is a fragmentary cross-sectional view in elevation taken along the line 5—5 of FIG. 2;

FIG. 6 is a fragmentary cross-sectional view in elevation taken along the line 6—6 of FIG. 2;

FIG. 7 is a fragmentary cross-sectional view in elevation taken in the vicinity of a machining station and showing the locating and clamping means for the tool head, the tool head driving motor supporting means and the workpiece saddle and index table;

FIG. 8 is a fragmentary elevational view showing the driving means for the saddle;

FIG. 14 is a partially sectioned elevational view showing a typical workpiece holding fixture;

FIG. 15 is a partly sectioned elevational view showing a typical multi-spindle drill head;

FIG. 16 is a fragmentary view similar to FIG. 15 showing a tap head;

FIG. 17 is a similar view showing a boring head;

FIG. 18 is a fragmentary view showing a mill head;

DESCRIPTION OF THE PREFERRED EMBODIMENTS

Figure 1:
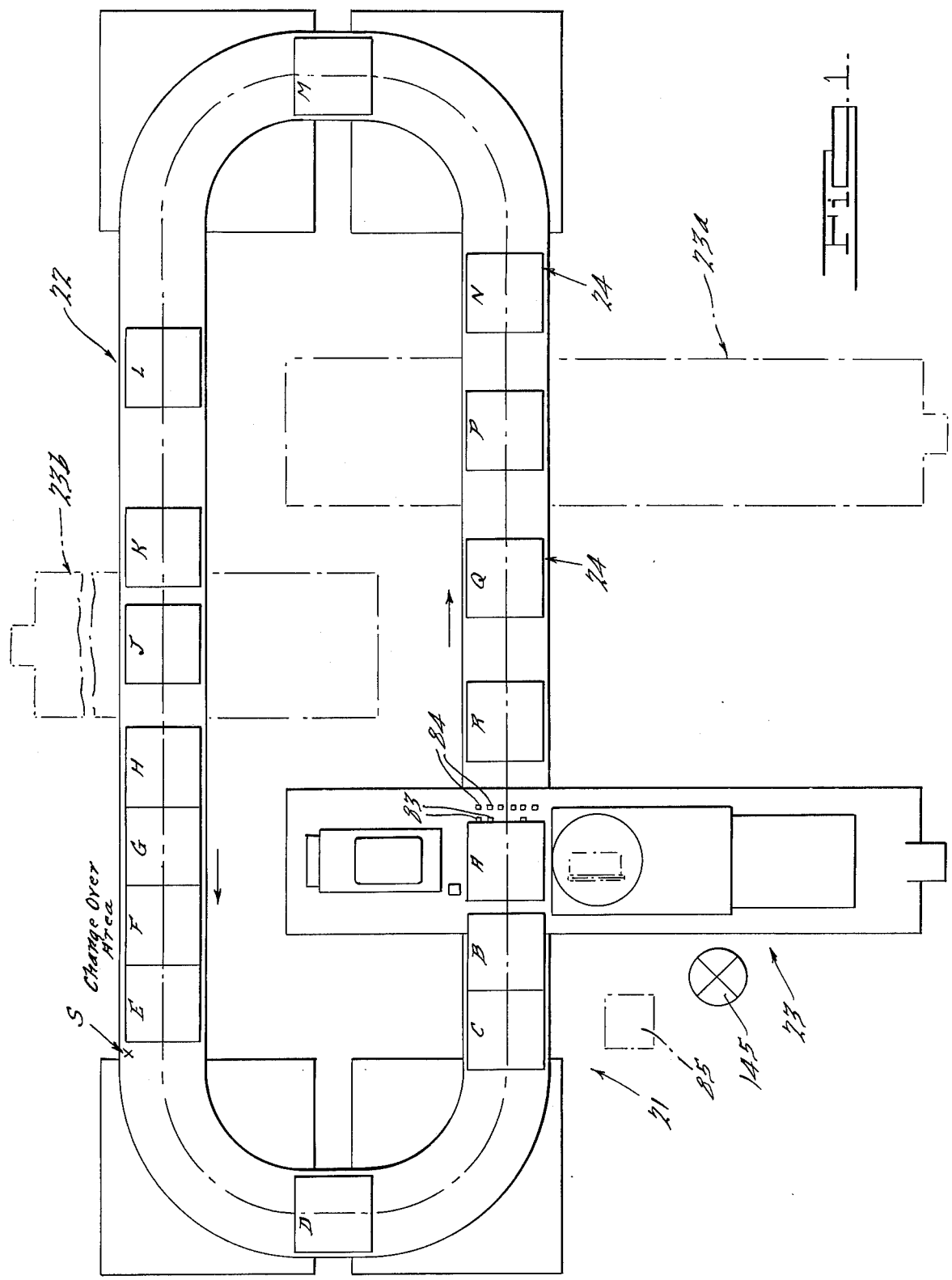
FIG. 1 is a top plan view of the machining center showing the configuration of the track and the location of one or more machining stations.

The machining center is generally indicated at 21 in FIG. 1 and comprises an endless track generally indicated at 22, and a machining station generally indicated at 23 at one point on the track. Optionally, additional machining stations indicated at 23a and 23b may be installed at spaced points along the track, depending upon production requirements.

Track 21 is shown as being of elongated shape, defining a path having straight sections connected by curved sections. The track supports a plurality of tool heads indicated generally at 24. In the illustrated embodiments, the heads are supported for non-synchronous movement. That is, a given tool head or heads may be held stationary at certain positions along the track while other tool heads are moving along the track until they abut a tool head being held stationary, or are otherwise stopped or held in a manner described below. In any event, all tool heads according to the illustrated embodiment of the invention stay in the same sequence and are at all times on the path defined by track 22. A tool change over area is provided on the track, having a selectively operable stop S to allow a tool set-up operator to replace dull tools or alter the tool set-up as required. The ability to change tooling at this station during the machining cycle at station 23 increases net output. With track 22 at a conventional level, the operator need not climb a ladder to change tools, as in some known installations.

Figure 10:
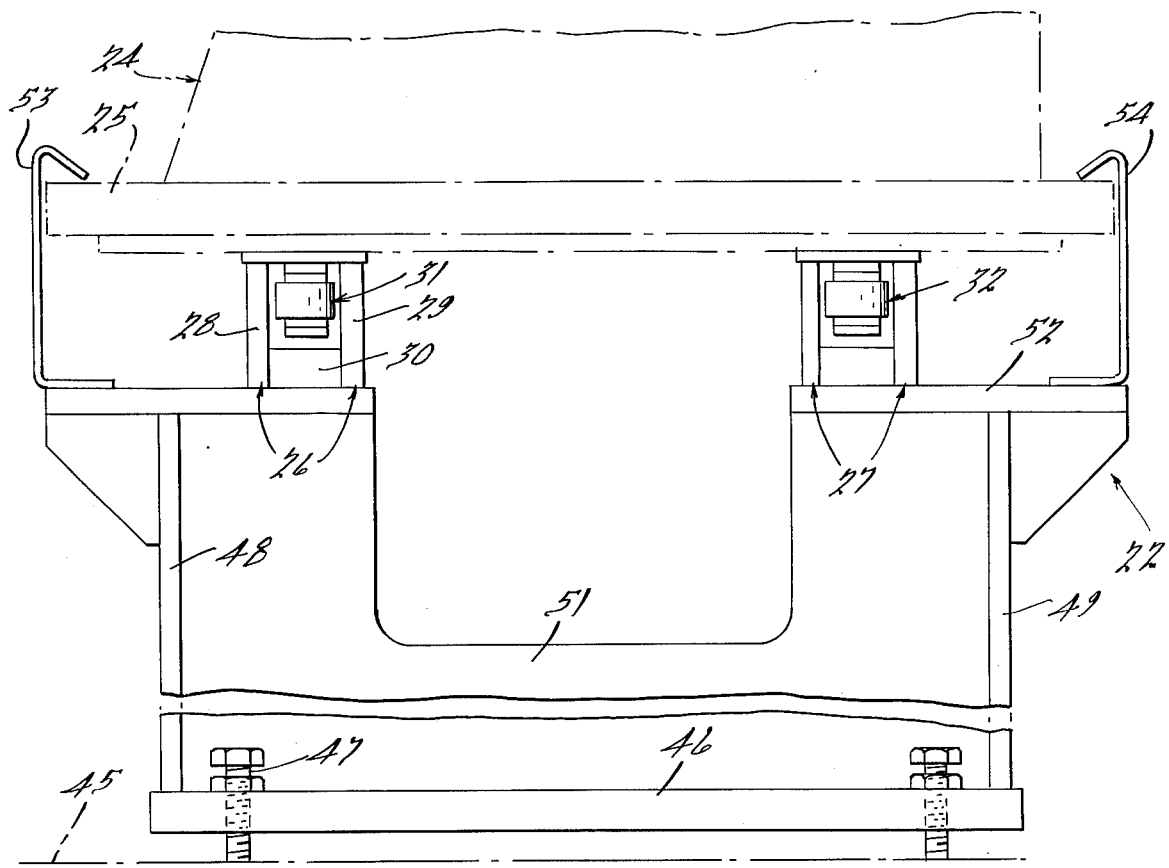
FIG. 10 is a cross-sectional view in elevation showing the support for the rails and chains and the side guide means for the tool heads.
Figure 11:
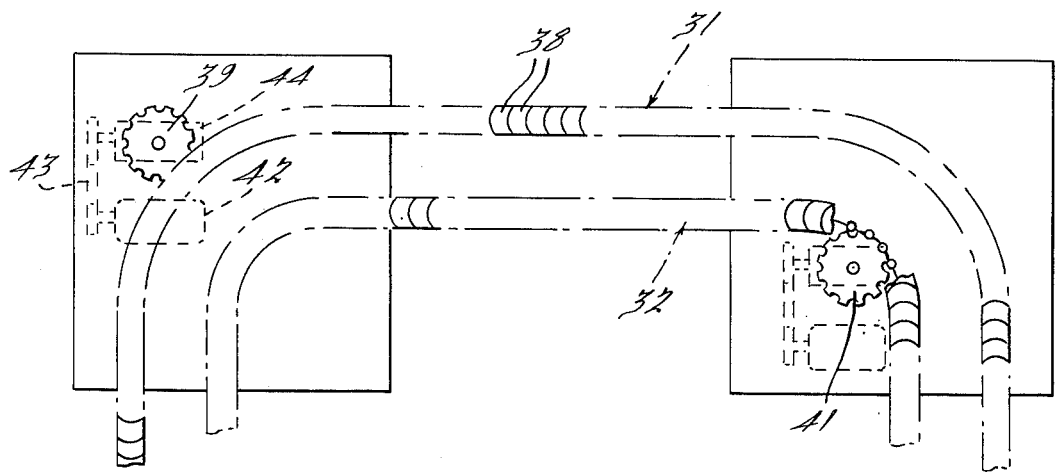
FIG. 11 is a fragmentary top plan view, parts being omitted, and showing the chain driving means.
Figure 12:
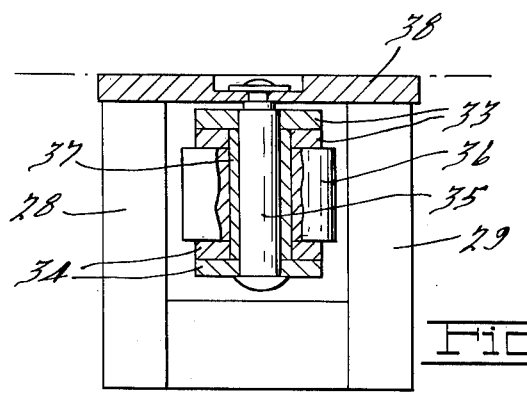
FIG. 12 is a fragmentary elevational view in cross section showing the chain construction.
Figure 13:
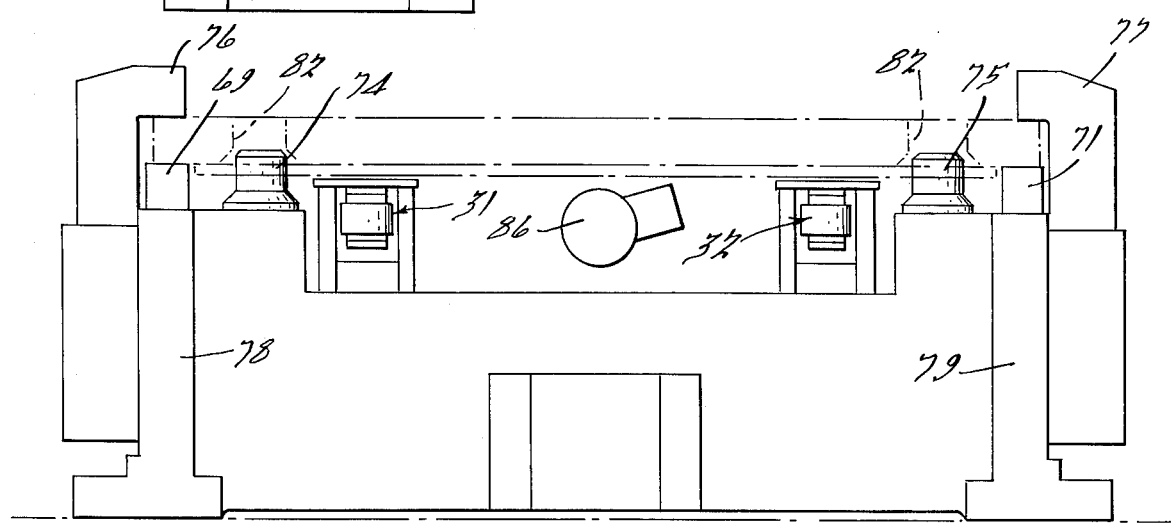
FIG. 13 is a cross-sectional view in elevation showing the tool head guide and support rails as well as the locating and clamping means.

Illustratively, sixteen tool heads are shown in FIG. 1, marked from A to R, the tool heads moving counterclockwise. The tool heads could be multi-spindle drill heads, tap heads, boring or milling heads, and each tool head has a bottom plate 25 (FIG. 10). Track 22 comprises a pair of rails generally indicated at 26 and 27. Each rail comprises a pair of upstanding members 28 and 29 separated by spacer 30. Chains generally indicated at 31 and 32 are disposed between the two pairs of rail members (FIG. 13). Each chain comprises side plates 33 and 34 (FIG. 12) connected by vertical rivets 35 carrying rollers 36 on bushings 37. Crescent top riding plates 38 (FIG. 11) are secured to the upper ends of rivets 35 and their outer margins rest on the upper surfaces of members 28 and 29. Bottom plates 25 rest on plates 38 so that the bottom plates and crescent top riding plates have mutually engageable surfaces which form a frictional and yieldable driving connection between the chains and tool heads.

Means are provided for continuously driving chains 31 and 32. This means may comprise chain drive sprockets 39 and 41 which would be driven by electric motors 42 through belts 43 and reduction gearing 44.

FIG. 10 illustrates a manner in which track 22 may be supported on a floor 45. A base 46 having leveling means 47 is provided with upright sections 48 and 49 and webs 51. Platforms 52 at the upper end of the support carry supporting rails 26 and 27, as well as side guide means 53 and 54 for the tool heads.

FIG. 7 shows portions of a machining station 23, and more particularly the tool head drive means and tool head clamping and locating means. The tool head drive means is generally indicated at 55 and comprises a base 56 supporting a slide 57 movable transversely to track 22. A motor 58 is mounted on the slide and has a shaft 59 with a clutch 61 engageable with a drive coupling 62 on the tool head. Clutch 61 may be a suitable air clutch, and an air brake 63 is mounted on the other end of shaft 59. A rotary union 64 may also be provided on the shaft for coolant or compressed air.

Tool head drive means 55 is movable between a driving position shown in solid lines in FIG. 7 in which clutch 61 engages the coupling of 62 of a stopped and secured tool head, and a retracted position disengaged therefrom, a portion of the clutch 61 being shown in dot-dash lines in FIG. 7 in its retracted position. The means for moving drive means 55 between its position comprises a screw 65 rotatable by a drive 66 mounted on base 56. A screw thrust block 67 is disposed between drive 66 and a way 68 on base 56 which supports slide 57.

The locating and securing means for the tool heads at machining station 23 may be similar to that shown in U.S. Pat. Nos. 2,672,675, 2,673,386, and 3,155,217. A pair of support rails 69 and 71 are provided at machining station 23 for the inner and outer edges respectively of each bottom plate 25 (FIG. 13). The upper surfaces of these rails are slightly higher than the level of crescent top riding plates 38. For this purpose, rails 69 and 71 are provided with beveled portions 72 and 73 (FIG. 2) at their ends.

Two pairs of locating pins 74 and 75 are disposed between rails 69 and 71 respectively and their adjacent chains 31 and 32. Two pairs of tool head clamps 76 and 77 are mounted outwardly of the rails. The clamps, as well as rails 69 and 71, are supported by uprights 78 and 79. Clamps 76 and 77 are vertically movable, as are the locating pins, by a locate and clamp actuating cylinder 81 (FIG. 2). The sequence of operation is such that the locating pins will first be raised to enter locating holes 82 on the bottom plate, and clamps 76 and 77 will then be lowered to firmly secure the bottom plate to rails 69 and 71. When releasing the tool head, the clamps will first be lifted and the locating pins then lowered.

Normally, each successive tool head 24 is located and clamped after being stopped at the machining station. However, if at any point in the machining of a part a tool head not required for that part arrives at the station, it may be discharged without being located and clamped. One manner in which this may be carried out is by making the locating and securing means responsive to identification means on a particular tool head. For example, each tool head could carry a distinctive set of identification means such as signal switch operators 83 which actuate identifying means in the form of sensing switches 84 at the machining station. These sensing switches will send a signal to a computer or other control means 85 which will compare the signal with the desired machining program for the particular workpiece at the machining station. If the tool head is to be used, a signal will be sent to locate and clamp cylinder 81. Otherwise, the stopped tool head will not be located or clamped but discharged from the machining station and the next tool head placed therein.

Means are provided for holding each successive tool head at a position in advance of the machining station and for moving a tool head so held into said machining station. As seen best in FIGS. 2 through 6, these means comprise a shuttle bar 86 and an escapement bar 87 extending parallel to the track adjacent machining station 23. The shuttle bar is supported by concave rollers 88 for reciprocating as well as rocking movement about its own axis. Shuttle bar 86 is provided with a pair of axially spaced dogs 89 and 91 which are adapted to engage the leading and trailing ends respectively of each bottom plate 25. The bottom plates are provided with recesses 92 and 93 for this purpose.

A double-acting hydraulic cylinder 94 is connected to shuttle bar 86 for moving the bar between a retracted position in which dogs 89 and 91 are engageable with a tool head 24 immediately before the machining station, and an advanced position in which such head is moved into the machining station. Dog 89 is somewhat longer than dog 91, and when this advancing movement takes place it is engageable with a shoulder 95 on the tool head 24 at the machining station, discharging this tool head from the station.

Escapement bar 87 has a pair of longitudinally spaced escapement dogs 96 and 97, these dogs also being angularly offset as seen in FIGS. 4 and 5. The escapement bar is supported for rocking movement only by uprights 98, the location of the dogs being such that dog 96 will be capable of holding a tool head which is two heads in advance of the machining station, dog 97 holding a tool head immediately in advance of the station.

A double acting bar rotate cylinder 98 is provided, this cylinder having a rod extension 99 with recesses 101 and 102 (FIG. 6) which receive enlargements 103 and 104 on shuttle bar 86 and escapement bar 87 respectively. When extension 99 is advanced, escapement dog 97 will be moved to its holding position and dog 96 to its releasing position. Shuttle bar will be moved so as to retract its dogs downwardly. Retracting movement of extension 99 will have the opposite effect.

The operation of the holding, advancing and discharge means may be best described with respect to heads designated F, G and H in FIG. 2. Head F is shown at the machining station, head G in advance of the machining station and head H in advance of head G. Starting from a condition in which head G is trapped between shuttle dogs 89 and 91 and escapement dog 96 is holding head H position as shown, locate and clamp actuating cylinder 81 will advance, unclamping and disengaging the locating pins from head F. Shuttle cylinder 94 will advance, pushing head F out of the machining station and transferring head G into the machining station. If head G is the correct head, for example as indicated by sensing switches 84 to control means 85, cylinder 81 will retract, locating and clamping head G in the machining station. Bar rotate cylinder 98 will advance, disengaging the shuttle dogs from head G and releasing head H. Transport chains 31 and 32 will carry head H until it is stopped by escapement dog 97 at the former location of head G. Shuttle cylinder 94 will retract, returning the shuttle bar to its original position, and cylinder 98 will then retract, causing the shuttle dogs to engage head H. This will also rotate escapement dog 96 in front of the next head in the system and remove escapement dog 97 from in front of head H. The parts are then ready for the next cycle.

Figure 9:
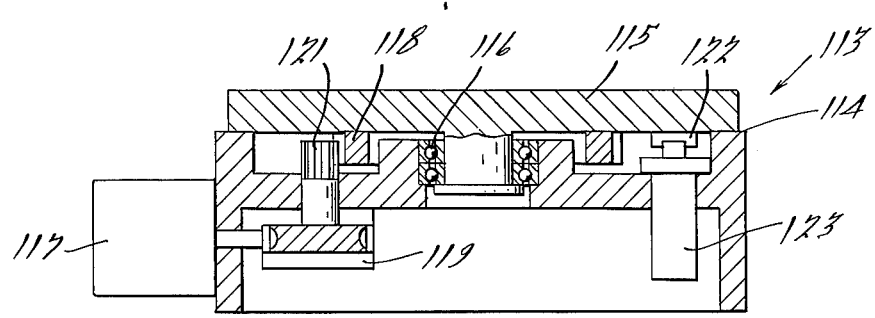
FIG. 9 is a cross-sectional view showing the driving means for the index table.

The work supporting means is illustrated in FIGS. 7, 8 and 9 and comprises a base 105 extending laterally from track 22 on the other side from the tool head drive means, and a saddle 106 slidably mounted on base for movement toward and away from a tool head secured at the machining station. It should be understood that other types of work supporting means, including cross feed components, could be utilized within the principles of the invention. Saddle 106 has keepers 107 engageable with ways 108 on base 105. A feed and traverse drive 109 is mounted on the outer portion of base 105 and is connected to saddle 106 by a thrust block 110, a screw 111 and a ball nut 112. The feed and traverse drive may be of the type illustrated in U.S. Pat. No. 3,213,711.

An index table generally indicated at 113 is mounted on saddle 106. The index table has a rest surface 114 supporting a rotatable dial table 115 with a radial bearing 116. The means for rotating table 115 comprises an electric drive motor 117 driving a ring gear 118 through a gear box 119 and a pinion 121 and ring gear 118 beneath table 115. The underside of table 115 is provided with one or more table stop buttons 122 cooperating with a table stop mechanism 123. The general construction of index table 113 may be like that shown in U.S. Pat. No. 3,048,059.

FIG. 14 shows a typical workpiece holding fixture generally indicated at 124 which is mountable on index table 113. The holding fixture has uprights 125 and upper members 126 carrying clamp screws 127 with clamps 128 engageable with the workpiece, indicated in dot-dash lines at 129. The fixture is also provided with rest pads 131 and locating pins 132 for the workpiece. If desired, one or more limit switches 133 may be carried by the fixture, these limit switches being engageable with the workpiece so as to act as workpiece identification signal means. This signal means could be connected to control means 85.

FIGS. 15 through 18 show typical multi-spindle tool heads 24 for various machining operations. The drill head 24a in FIG. 15 has a drive shaft 134 which rotates drive gears 135 for spindles 136. Workpiece 129 will be fed toward the spindles during the drilling operation.

FIG. 16 shows a tap head 24b in which a drive shaft 137 drives gears 138 for spindles 139, the spindles being mounted in lead nuts 141. In this case, the workpiece 129 will be traversed until the taps 142 are engaged, and the taps will then be fed into the workpiece.

FIG. 17 shows a typical multi-spindle boring head 24c having parts similar to the tool heads previously described but with boring tools 143.

FIG. 18 shows a multi-spindle mill head 24d having milling tools 144.

A typical example of a cycle sequence for a given workpiece 129 will now be described. When a workpiece is loaded and clamped into fixture 124, the operator standing, for example, at the machining station position marked 145 in FIG. 1 will operate a selector switch to indicate which workpiece is in the fixture, thus causing control means 85 to select or maintain the correct program. Alternatively, limit switches 133 may indicate the workpiece to the control means. Assuming that the tool head marked A in FIG. 1 is at the machining station 23, sensing means 84 will indicate to the control means that head A is in working position. The control means will check whether head A is the required head for the first operation. If so, it will signal cylinder 81 to locate and clamp the head, and also signal drive 66 to advance the tool head driving means into engagement with the tool head and start drive motor 58. The control means will also signal index table 113 to properly position the workpiece. For example, if the workpiece has two surfaces to be machined, the index table could be rotated to cause the first surface to face the tool head. Means are provided for signaling the control means that the index table has been properly rotated. The control means will then signal drive 109 to advance saddle 106 at a rapid speed until, at a forward position indicated by a limit switch, the machine feed stroke will start. A signal indicating completion of the feed stroke will cause the saddle to be rapidly retracted to a position clearing the tool head. When saddle 106 has reached its retracted position, a signal given to control means 85 will cause motor slide 57 to be retracted and will stop motor 58.

When retraction of the motor slide is completed and motor 58 stopped, a signal will cause unclamping of tool head A and retraction of locating pins 74 and 75. The signal given to the control means when this operation is accomplished will cause shuttle bar 86 to discharge head A from machining station 23 and move head B into the machining station where it stops as the piston of cylinder 94 reaches the end of its stroke. Head C will meanwhile be moved by chains 31 and 32 into the previous position of head B.

The identification of head B will be sent to the control means. If the latter determines that head B is in position and if this is the proper head for the next machining operation on the workpiece, the locating, clamping, driving, work feed, and disengaging operations will be carried out as before. After all operations on one face of the workpiece have been completed, the next head coming into the machining station will signal the control means to operate drive motor 117 of index table 113, rotating the index table so as to bring the second workpiece surface into machining position, so that it will be engaged by the next group of heads. The operations will then be carried out as before. As mentioned previously, if any tool head arriving at the machining station is identified as being incompatible with the particular program, it will be discharged and replaced by the next head.

Figure 19:
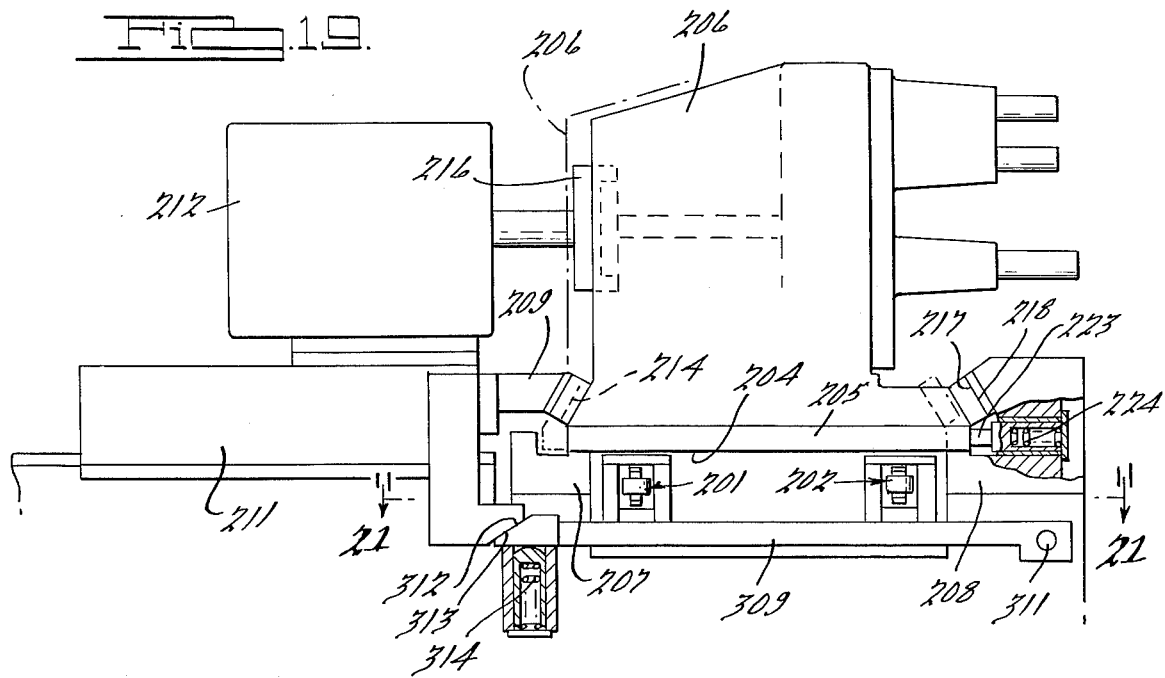
FIG. 19 is an elevational view, partly cross sectioned, showing a modified form of the invention in which the tool head locating and securing means at the machining station comprises cam means on the tool head drive means engageable with the tool head.
Figure 20:
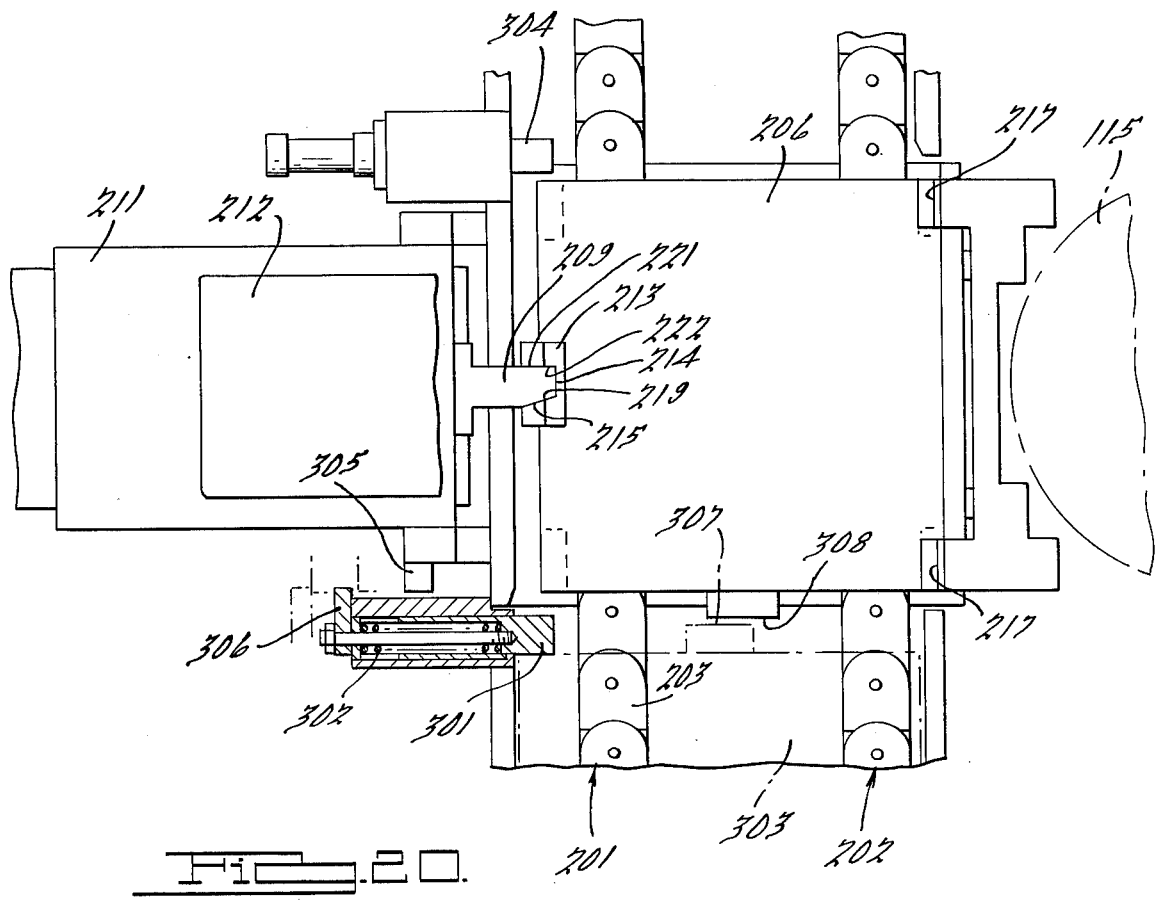
FIG. 20 is a top plan view of the mechanism of FIG. 19.
Figure 21:
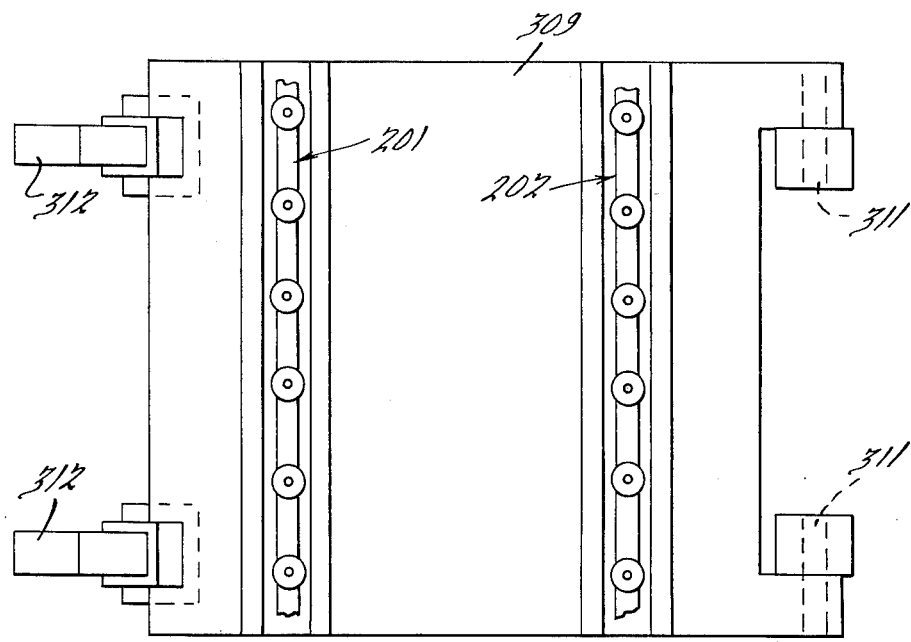
FIG. 21 is a top plan view of the retractable chain support carriage at the machining station taken along the line 21—21 of FIG. 19.

FIGS. 19, 20 and 21 show another embodiment of the tool head locating and securing means, this means comprising cam means on the tool head drive means engageable with the tool head when the drive means is engaged with the tool head. In this embodiment, two endless chains generally indicated at 201 and 202 are provided on the track, these chains being constructed similarly to the previous embodiment and having plates 203 which form a yieldable driving connection with the undersurfaces 204 of the bottom plates 205 on the machine tool heads, one such head being indicated at 206. A pair of support rails 207 and 208 are provided at the machining station similarly to support rails 69 and 71 of the previous embodiment.

The locating and clamping means comprises a cam-like wedge 209 carried by slide 211 for tool head drive motor 212. This wedge is downwardly inclined and coacts with a complementary cam 213 carried by tool head 206. The action of wedge 209 on cam 213 is such that the wedge will tend to push the tool head down and to the right in FIG. 19 by virtue of wedge surface 214 and opposite to the direction of chain movement (FIG. 20) because of wedge surface 215.

Before wedge 209 engages cam 213, tool head 206 will be in the dot-dash line position shown partially in FIG. 19. As slide 211 advances to engage clutch element 216 with the tool head drive shaft, the tool head will be moved toward the right until it reaches its solid line position. A pair of stationary locating surfaces 217 are provided at the machining station on the side opposite slide 211. These surfaces are inclined downwardly and coact with complementary surfaces 218 on the tool head so as to limit the rightward movement of the head. At the same time, surfaces 214 and 217 will clamp the tool head against supports 207 and 208. Location of the tool head 206 in the longitudinal direction of the track will take place by means of wedge surface 215 engaging complementary surface 219 on cam 213 until a surface 221 on the wedge engages a complementary surface 222 on the cam. In its located and secured position, tool head 206 will still be on the path defined by the track.

Means are provided for returning tool head 206 to its normal position when slide 211 is retracted. This means comprises a rail 233 on the side of the track opposite slide 211 and urged by spring means 224 toward the slide. Rail 223 is located beneath surfaces 217 and is engageable by the facing edge of bottom plate 205 when the tool head is moved toward its located and secured position, compressing spring means 224. Retraction of slide 211 will permit the spring means to urge rail 233 outwardly, returning the tool head to its dot-dash position of FIG. 19.

The locating and clamping means so far described with respect to FIGS. 19, 20 and 21 will operate in conjunction with the remaining portions of the system similarly to the pins and clamps of the previous embodiment. That is, the shuttle and escapement bars will still be used and will advance successive tool heads into the machining station as before, the only difference being that the locating and clamping will take place in conjunction with advancing of the tool head driving means, and the unclamping at the same time as retraction of the driving means.

FIGS. 19–21 also illustrate means for holding a tool head in advance of and at the machining station which could take the place of the shuttle and escapement bars and their attendant mechanisms described with respect to the previous embodiment. This comprises a stop 301 mounted for transverse movement in advance of the machining station and urged by spring means 302 to a position in which an advancing tool head 303 will be held at a point immediately ahead of the machining station. Another stop 304 is provided at the machining station for stopping a tool head 206 which has been advanced to the station so that it is capable of being properly located by the locating and clamping means discussed above with respect to FIGS. 19, 20 and 21. A stop retracting dog 305 carried by slide 211 is engageable with a member 306 carried by stop 301 to retract the stop against the urging of spring means 302 when slide 211 is retracted. Retraction of stop 304 will be coordinated with the movement of stop 301 to enable a tool head released by stop 301 to be advanced into the machining station, discharging the tool head at the machining station by their mutually abutting surfaces 307 and 308.

In order to further assure proper locating and securing of a tool head at the machining station, and to disengage the tool head moving means after locating and securing has been accomplished, chains 201 and 202 may be mounted on a retractable chain support carriage 309 at the machining station. This carriage is pivoted at 311 on its side remote from slide 211 and has a cam surface 312 adjacent the slide and engageable by a complementary wedge 313 on slide 211. Carriage 309 is normally urged upwardly by spring means 314, but will be retracted downwardly when wedge 313 engages cam 312. This will assure disengagement of chain plates 203 from bottom plate 205.

While it will be apparent that the preferred embodiments illustrated herein are well calculated to fulfill the objects above stated, it will be appreciated that the present invention is susceptible to modification, variation and change without departing from the scope of the invention.

I claim:

1. In a machining center, a fixed endless track defining a path of constant length, a plurality of tool heads slidably supported for movement along said track, whereby individual tool heads may be lifted off said track, a machining station on said track, means at said station for accurately locating and securing certain tool heads while still on the path of said track for a machining operation, tool head drive means at said station, means for selectively engaging said drive means with a secured tool head, work supporting means at said station, means for moving said work supporting means from a retracted position to a position in which the workpiece is engaged by the tools carried by the tool head and back to a retracted position, at least one endless driving member extending along said track, drive means continuously driving said driving member, and mutually engageable surfaces on said driving member and tool heads forming a yieldable driving connection, whereby certain tool heads may be advanced along said track while other tool heads are held stationary.

2. A machining center according to claim 1, said track being horizontal and comprising guide means extending along said path, said tool heads being guided by said guide means.

3. A machining center according to claim 1, further provided with selectively operable stopping means, whereby a selected tool head may be halted for changeover purposes.

4. A machining center according to claim 1, said locating and securing means comprising pins and clamps at said station movable into engagement with said tool heads.

5. A machining center according to claim 1, further provided with control means for the machining programs of a plurality of different workpieces, workpiece identification signal means connected to said control means, tool head identifying means at said machining station and connected to said control means, and identification means carried along with each tool head and coacting with said identifying means.

6. A machining center according to claim 1, said tool head drive means being on one side of said track, said work supporting means comprising a saddle on the side of said track opposite said tool head drive means, and a rotatable index table on said saddle supporting a workpiece fixture.

7. A machining center according to claim 6, further provided with control means for the machining programs of a plurality of different workpieces, workpiece identification signal means on said work supporting means connected to said control means, tool head identifying means at said machining station and connected to said control means, identification means carried along with each tool head and coacting with said identifying means, and means on said control means for controlling the position of said index table.

8. A machining center according to claim 1, each tool head having a drive coupling, said tool head drive means comprising a slide movable transversely to said track, a motor on said slide having a shaft, and a clutch on said shaft engageable with the drive couplings of said tool heads.

9. A machining center according to claim 8, said tool head locating and securing means being carried by said slide for the tool head drive means.

10. In a machining center, a fixed endless track defining a path of constant length, a plurality of tool heads supported for movement along said track, a machining station on said track, means at said station for accurately locating and securing certain tool heads while still on the path of said track for a machining operation, tool head drive means at said station, means for selectively engaging said drive means with a secured tool head, work supporting means at said station, means for moving said work supporting means from a retracted position to a position in which the workpiece is engaged by the tools carried by the tool heads and back to a retracted position, and means for holding at least one tool head in advance of said machining station independently of the movement of said other tool heads.

11. In a machining center, a fixed endless track defining a path of constant length, a plurality of tool heads supported for movement along said track, a machining station on said track, means at said station for accurately locating and securing certain tool heads while still on the path of said track for a machining operation, tool head drive means at said station, means for selectively engaging said drive means with a secured tool head, work supporting means at said station, means for moving said work supporting means from a retracted position to a position in which the workpiece is engaged by the tools carried by the tool heads and back to a retracted position, means for holding a tool head in advance of said machining station independently of the movement of said other tool heads, and means for moving the tool head so held into said machining station.

12. A method of machining workpieces comprising the steps of arranging a plurality of tool heads for sliding movement in succession along an endless fixed track defining a path of constant length, whereby individual tool heads may be lifted off said track, mounting a workpiece at a machining station for movement toward and away from said track, moving a first tool head along said track to said machining station in a yieldable manner, whereby certain tool heads may be advanced along said track while other tool heads are held stationary, accurately locating and securing said tool head at said machining station while still on the path of said track, engaging said tool head with a drive means located at said machining station, moving said workpiece from a retracted position to a position in which the workpiece is engaged by the tools carried by the tool head and back to a retracted position, disengaging said drive means from said tool head, and discharging said tool head from said machining station.

13. The method according to claim 12, further comprising the steps of holding at least a second tool head in advance of said machining station while said first tool head is at the station, disengaging and discharging said first tool head from said machining station upon said retraction of the workpiece, moving said second tool head into said station upon discharge of the first head therefrom, accurately locating and securing said second tool head at said station while still on the path of said track, engaging said second tool head with said drive means, and moving said workpiece from its retracted to its tool-engaging position and back to its retracted position with respect to said second tool head.

14. The method according to claim 13, further comprising the step of rotating said workpiece after its first retraction to present a different surface to said second tool head.

15. The method according to claim 12, further comprising the step of stopping selected tool heads at a point on said track remote from said machining station for changeover purposes.

16. The method according to claim 12, further comprising the steps of advancing successive tool heads into said machining station after said first tool head has been discharged therefrom, sensing whether each tool head is appropriate for machining said workpiece as it reaches the machining station, locating, securing, and driving only those tool heads appropriate for said machining, advancing and retracting the workpiece only for the appropriate tool heads, and discharging tool heads from said station which are not appropriate for machining said workpiece without being engaged by said drive means and without said advancing movement of the workpiece.

17. In a machining center, an endless track defining a horizontal path, guide means extending along said path, a plurality of tool heads guided by said guide means and supported for movement along said track, at least one endless chain extending parallel to said guide means, means continuously moving said chain, mutually engageable driving surfaces on said chain and tool heads forming a yieldable driving connection, a machining station on said track, means for holding a tool head in advance of said machining station, means for moving a tool head so held into said machining station, means at said station for accurately locating and securing certain tool heads while stll on the path of said track for a machining operation, tool head drive means at said station, means selectively engaging said drive means with a secured tool head, work supporting means at said station, and means for moving said work supporting means from a retracted position to a position in which the workpiece is engaged by the tools carried by the tool head and back to a retracted position.

18. In a machining center, an endless track defining a path, a plurality of tool heads supported for movement along said track, a machining station on said track, means for holding at least one tool head in advance of said machining station, said holding means comprising an escapement bar extending parallel to said track adjacent said machining station, circumferentially and axially spaced dogs on said bar, means for rocking said bar on its axis, means at said station for accurately locating and securing certain tool heads while still on the path of said track for a machining operation, tool head drive means at said station, means selectively engaging said drive means with a secured tool head, work supporting means at said station, and means for moving said work supporting means from a retracted position to a position in which the workpiece is engaged by the tools carried by the tool head and back to a retracted position.

19. In a machining center, an endless track defining a path, a plurality of tool heads supported for movement along said track, a machining station on said track, means at said station for accurately locating and securing certain tool heads while still on the path of said track for a machining operation, tool head drive means at said station, means for selectively engaging said drive means with a secured tool head, work supporting means at said station, means for moving said work supporting means from a retracted position to a position in which the workpiece is engaged by the tools carried by the tool head and back to a retracted position, and a second machining station spaced along said track from said first station, said second station likewise having said locating and securing means for said heads, said tool head drive means and work supporting means.

20. In a machining center, an endless track defining a path, a plurality of tool heads supported for movement along said track, a machining station on said track, means for holding a tool head in advance of said machining station, means for moving the tool head so held into said machining station, said last-mentioned means comprising a shuttle bar extending parallel to said track adjacent said machining station and having axially spaced dogs thereon, means for reciprocating said shuttle bar, means at said station for accurately locating and securing certain tool heads while still on the path of said track for a machining operation, tool head drive means at said station, means selectively engaging said drive means with a secured tool head, work supporting means at said station, and means for moving said work supporting means from a retracted position to a position in which the workpiece is engaged by the tools carried by the tool head and back to a retracted position.

21. A method of machining workpieces comprising the steps of arranging a plurality of tool heads for movement in succession along an endless track defining a path, mounting a workpiece at a machining station for movement toward and away from said track, moving a first tool head along said track to said machining station, accurately locating and securing said tool head at said machining station while still on the path of said track, engaging said tool head with a drive means located at said machining station, moving said workpiece from a retracted position to a position in which the workpiece is engaged by the tools carried by the tool head and back to a retracted position, disengaging said drive means from said tool head, discharging said tool head from said machining station, and moving said tool heads along said track in a non-synchronous manner, whereby tool heads in advance of the machining station continue to move while a tool head is secured at said machining station.

22. A method of machining workpieces comprising the steps of arranging a plurality of tool heads for movement in succession along an endless track defining a path, mounting a workpiece at a machining station for movement toward and away from said track, moving a first tool head along said track to said machining station, accurately locating and securing said tool head at said machining station while still on the path of said track, engaging said tool head with a drive means located at said machining station, moving said workpiece from a retracted position to a position in which the workpiece is engaged by the tools carried by the tool head and back to a retracted position, disengaging said drive means from said tool head, discharging said tool head from said machining station, mounting a second workpiece at a second machining station spaced along said track from said first station, locating and securing certain tool heads as they arrive at said second station while still on the path of said track, engaging the tool heads secured at said second station with a drive means located at the second station, and moving the workpiece at said second station between retracted and tool-engaging positions with respect to the tool heads secured at the second station.

23. In a machining center, an endless track defining a path, a plurality of tool heads supported for movement along said track, a machining station on said track, means at said station for accurately locating and securing certain tool heads while still on the path of said track for a machining operation, tool head drive means at said station, means for selectively engaging said drive means with a secured tool head, work supporting means at said station, means for moving said work supporting means from a retracted position to a position in which the workpiece is engaged by the tools carried by the tool head and back to a retracted position, and means for stopping individual tool heads independently of the continued movement of other tool heads.

24. In a machining center, an endless track defining a path, a plurality of tool heads slidably supported for movement along said track, a machining station on said track, whereby individual tool heads may be lifted off said track, means at said station for accurately locating and securing certain tool heads while still on the path of said track for a machining operation, tool head drive means at said station separate from said locating and securing means, means for selectively engaging said drive means with a secured tool head, work supporting means at said station, means for moving said work supporting means from a retracted position to a position in which the workpiece is engaged by the tools carried by the tool head and back to a retracted position, at least one endless driving member extending along said track, drive means continuously driving said driving member, and mutually engageable surfaces on said driving member and tool heads forming a yieldable driving connection, whereby certain tool heads may be advanced along said track while other tool heads are held stationary.

25. A machining center according to claim 24, said endless track being fixed and of constant length.

26. A method of machining workpieces comprising the steps of arranging a plurality of tool heads for sliding movement in succession along an endless track defining a path, whereby individual tool heads may be lifted off said track, mounting a workpiece at a machining station for movement toward and away from said track, moving a first tool head along said track to said machining station in a yieldable manner, whereby certain tool heads may be advanced along said track while other tool heads are held stationary, accurately locating and securing said tool head at said machining station while still on the path of said track, engaging said tool head with a drive means located at said machining station and separate from said locating and securing means, moving said workpiece from a retracted position to a position in which the workpiece is engaged by the tools carried by the tool head and back to a retracted position, disengaging said drive means from said tool head, and discharging said tool head from said machining station.

27. In a machining center, an endless track defining a path, a plurality of tool heads supported for movement along said track, each tool head having a drive coupling, a machining station on said track, means at said station for accurately locating and securing certain tool heads while still on the path of said track for a machining operation, tool head drive means at said station, said tool head drive means comprising a slide movable transversely to said track, a motor on said slide having a shaft, a clutch on said shaft engageable with the drive couplings of said tool heads, means for selectively engaging said drive means with a secured tool head, work supporting means at said station, and means for moving said work supporting means from a retracted position to a position in which the workpiece is engaged by the tools carried by the tool head and back to a retracted position.

* * * * *